Jan. 9, 1962  C. DOMENIGHETTI  3,016,232
MIXER DRIVEN AND SUPPORTED BY WHEELS
OF FLEXIBLE MATERIAL
Filed July 7, 1959

INVENTOR
Costante DOMENIGHETTI
BY Leon M. Strauss
AGT.

United States Patent Office 3,016,232
Patented Jan. 9, 1962

3,016,232
MIXER DRIVEN AND SUPPORTED BY WHEELS
OF FLEXIBLE MATERIAL
Costante Domenighetti, Piazzale Giulio Cesare 20,
Milan, Italy
Filed July 7, 1959, Ser. No. 825,547
3 Claims. (Cl. 259—177)

The conventional mixers provided with a rotating drum as for instance those used for the mixing of concrete, comprise a rotating drum provided with a peripheral toothed band engaging a drive gear.

These conventional mixers have many disadvantages the most important of which are the necessity of an expensive working to form the outer toothed surfaces and the loud noise during the mixing process.

The present invention relates to a mixer without the above disadvantages which is characterized by that it is supported and set into rotation by wheels of flexible material, preferably by pneumatic tires resting against the outer surface of the rotating drum, one at least of said wheels being a driving wheel.

The accompanying drawing shows by way of example a mixer according to the present invention wherein.

Figure 1:
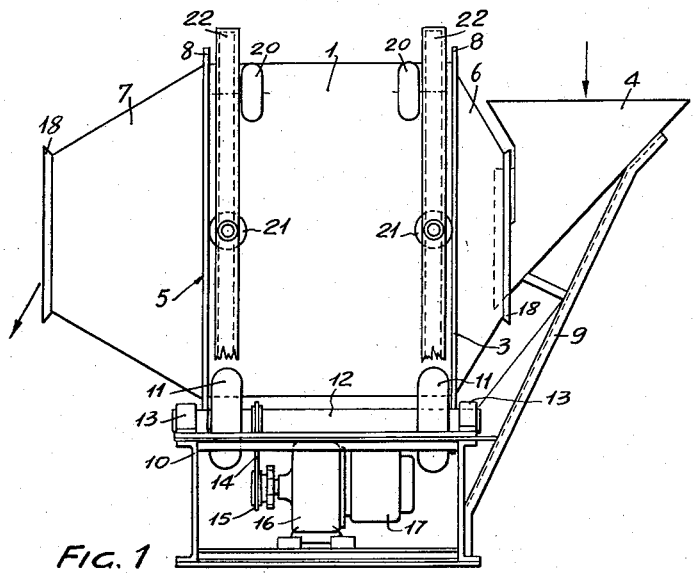
FIG. 1 is a side elevational view.

As clearly shown in the drawing, the mixer comprises a rotating drum 1, the inner part of which is possibly but not necessarily provided with paddles 2 for improving the mixing. The drum 1 has at one side an inlet opening 3 for the material coming from a feed-hopper 4 and at the opposite side an outlet or discharge opening 5.

As shown in FIG. 1 the said drum may be of the type effecting the mixing when rotating in one sense and effecting the discharge of the material when rotating in the opposite direction or it may have a unique direction of rotation as the conventional drum concrete mixers.

The characteristics of the present mixer relate to:

(1) the system for effecting the rotation of the drum in one or the other direction by means of wheels of flexible material mounted on two parallel axes.

(2) the system for resiliently supporting the drum without requiring expensively worked and exactly finished rings or rails, the noise due to the rotation of rigid wheels on rigid ring surfaces being thus eliminated.

(3) The system of mounting the feed-hopper 4, which may be rapidly removed for effecting the cleaning of the inner part of the mixer.

The flexible wheels may consist of tires, which allow a very much cheaper structure for the driving and the supporting of the drum. This transmission system by means of tires also enables to have less energy losses than by the conventional rigid supporting system. The driving of the drum by said wheels is furthermore effected by friction instead of by a large peripheral gear mounted on the drum and engaging a wheel driven by the engine. In the case of mixers wherein the discharge is obtained by reversal of rotation direction, the resilient transmission and supporting system avoids the shocks at the reversal thus making the working smooth and noiseless.

As shown in FIG. 1 the drum 1 has lateral tapered surfaces 6 and 7 in the shape of truncated cones and flanges 8 on both sides for defining the space for the supporting and for driving wheels 11. The feed-hopper 4 with its relative supporting element 9 rests on the frame 10 and is quickly removable therefrom. The flexible wheels 11 mounted on axes 12 by means of bearings 13 are actuated by the chain 14 and pulley wheel 15, which last is driven by the engine 17 through the reducer 16.

By electrical operation the reversibility of rotation direction is either obtained by inverting the polarity or by using reversing clutches. By operation with diesel or with gasoline engines the reversal is effected by mechanical or hydraulic inverters.

Figure 2:
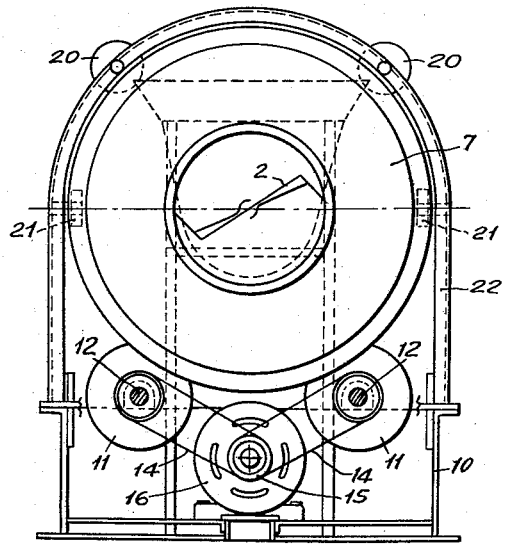
FIG. 2 is a front elevational view of the mixer according to the present invention.

Wheels 21 perpendicularly disposed with respect to wheels 11 may be provided for maintaining the correct longitudinal disposition of the drum and for imparting considerable longitudinal displacements of this last. The thrust wheels 21 may urge against flanges 8 or any other part of drum 8 and be inclined and directed at will. Other flexible wheels 20 may be provided to contact with the upper part of the drum, the wheels 20 being mounted on the stationary frame 22 to counterbalance the displacement of the drum. The front view of FIG. 2 shows the mixer as seen from the discharge opening and also illustrates a resilient transmission and supporting system for the drum as well as the transmission of the movement to the two axes.

The inlet opening of the tapered portion 6 and the outlet opening of the tapered portion 7 are each provided with a flange 18 just about perpendicular to the surface of the two tapered portions 6 and 7. During the whole mixing process as well as during the charging and discharging of the mixer, the flanges 18 and the flanges 8 keep the outer peripheral part of the drum 1 clean from the solid and liquid substances introduces to and respectively discharged from the mixer, so that the wheels 11 contacting the said peripheral part of drum 1 always engage a clean surface.

However even if some part of the mixing material should come on the outer surface of the drum 1, this last would not get damaged as the tires effectively overcome unevennesses and roughnesses.

However, with respect to conventional mixers, wherein the supporting wheels are rigid, the material on the outer surface of the drum is crushed between the rails mounted on the outer peripheral surface of the drum and the rigid supporting wheels, thus causing great defects in the functioning of the machine and wearing the contact surfaces.

What I claim is:

1. A mixer comprising a main frame, motor means mounted on said main frame including a pair of laterally spaced rotatable driving wheels including rotatable pneumatic tires, a drum having an axis of rotation and arranged above and supported on said tires and rotated on its axis of rotation thereby, said drum having a pair of flanges extending outwardly from the surface thereof at spaced locations in respect to its axis of rotation and extending around the periphery thereof, a pair of spaced frame members secured to said main frame and encircling said drum at locations adjacent respective flanges, and a roller rotatably mounted on each of said frame members arranged to bear in opposite axial directions in respect to said drum on respective flanges of said drum.

2. A mixer comprising a main frame, a pair of axles rotatably mounted at laterally spaced locations on said main frame, a pneumatic resilient tire affixed to each of said axles adjacent each end thereof and rotatable therewith, a mixing drum supported on top of said tires between said axles with the weight of the drum resting thereon and with the exterior surface of said drum in frictional contact with said tires, said drum having an axis of rotation, means to rotate said axles to rotate said drum about its axis of rotation, said drum having a pair of flanges extending outwardly from the surface thereof at spaced locations in respect to its axis of rotation and extending around the periphery thereof, a pair of spaced frame members secured to said main frame and encircling said drum at a location adjacent each respective flange, a first roller rotatably mounted on each of said frame members arranged to bear in opposite axial directions in respect to said drum on respective adjacent flanges of said drum, and a second roller rotatably mounted on each of said frame members arranged to bear in radial directions in respect to the axis of rotation of said drum directly on the surface of said drum.

3. A mixer according to claim 2, including a third roller rotatably mounted on each of said frame members and arranged to bear in a radial direction on the surface of said drum, said second and third rollers being disposed to bear against the upper surface of said drum at circumferentially spaced locations.

References Cited in the file of this patent
UNITED STATES PATENTS

| | | |
|---|---|---|
| 1,049,018 | Wheeler | Dec. 31, 1912 |
| 1,058,803 | Smith | Apr. 15, 1913 |
| 1,848,223 | Reed | Mar. 8, 1932 |
| 2,048,657 | Jaeger | July 21, 1936 |
| 2,503,361 | Studebaker | Apr. 11, 1950 |
| 2,538,871 | Jedlicka | Jan. 23, 1951 |
| 2,590,438 | Maxon | Mar. 25, 1952 |
| 2,638,625 | Studebaker et al. | May 19, 1953 |
| 2,837,321 | Gleason | June 3, 1958 |